US009413410B2

(12) United States Patent
You et al.

(10) Patent No.: US 9,413,410 B2
(45) Date of Patent: *Aug. 9, 2016

(54) RADIO-FREQUENCY DEVICE AND WIRELESS COMMUNICATION DEVICE

(71) Applicant: Wistron NeWeb Corporation, Hsinchu (TW)

(72) Inventors: Shang-Sian You, Hsinchu (TW); Yu-Sheng Fan, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/732,778

(22) Filed: Jun. 7, 2015

(65) Prior Publication Data

US 2016/0056853 A1    Feb. 25, 2016

(30) Foreign Application Priority Data

Aug. 25, 2014 (TW) .............................. 103129235 A

(51) Int. Cl.
*H04B 15/00* (2006.01)
*H04B 1/3827* (2015.01)

(52) U.S. Cl.
CPC .............. *H04B 1/3838* (2013.01); *H04B 15/00* (2013.01)

(58) Field of Classification Search
CPC ............................... H04B 15/00; H04B 1/3838
See application file for complete search history.

(56) References Cited

U.S. PATENT DOCUMENTS

| 7,805,171 | B2 * | 9/2010 | Alameh | H04M 1/6066 |
| | | | | 455/569.1 |
| 8,467,840 | B2 | 6/2013 | Lin | |
| 8,996,080 | B2 | 3/2015 | You | |
| 2006/0281423 | A1 * | 12/2006 | Caimi | H01Q 9/045 |
| | | | | 455/129 |
| 2007/0238496 | A1 * | 10/2007 | Chung | H04B 1/3838 |
| | | | | 455/575.7 |
| 2013/0120200 | A1 * | 5/2013 | Desclos | H01Q 25/04 |
| | | | | 343/745 |
| 2013/0130633 | A1 * | 5/2013 | Lin | H01Q 1/245 |
| | | | | 455/127.1 |
| 2013/0154894 | A1 * | 6/2013 | Caimi | H01Q 1/243 |
| | | | | 343/858 |
| 2014/0315606 | A1 * | 10/2014 | You | H04B 1/3838 |
| | | | | 455/575.5 |
| 2016/0013817 | A1 * | 1/2016 | Park | H01Q 1/243 |
| | | | | 455/522 |

FOREIGN PATENT DOCUMENTS

TW        I407632 B1      9/2013

* cited by examiner

*Primary Examiner* — David Bilodeau
(74) *Attorney, Agent, or Firm* — Winston Hsu; Scott Margo

(57) ABSTRACT

A radio-frequency device for a wireless communication device includes an antenna, a capacitive sensing unit, a connecting unit comprising a first terminal electrically connected to a radiating element of the antenna, a second terminal and a third terminal, conducting to each other, a direct-current (DC) blocking element for cutting off a DC signal route between the second terminal of the connecting unit and a signal feed-in unit of the antenna, a sensing auxiliary unit including a high-frequency blocking element for blocking a high-frequency signal route between the third terminal of the connecting unit and the capacitive sensing unit, and at least a capacitor connected to the high-frequency blocking element in series and electrically connected between the third terminal of the connecting unit and the capacitive sensing unit, for decreasing an equivalent capacitance from the connecting unit to the radiating element.

14 Claims, 11 Drawing Sheets

RADIO-FREQUENCY DEVICE AND WIRELESS COMMUNICATION DEVICE

BACKGROUND OF THE INVENTION

1. Field of the Invention

The present invention relates to a radio-frequency (RF) device and wireless communication device, and more particularly, to an RF device and wireless communication device capable of maintaining radiating efficiency, reducing the design and manufacturing costs as well as being modularized.

2. Description of the Prior Art

A wireless communication device is equipped with an antenna to emit or receive radio waves, so as to exchange radio-frequency (RF) signals and access a wireless communication system. Since radio waves are high-frequency sinusoidal signals, every country in the world standardizes the power of radio waves mainly for preventing from affecting users and/or interfering operations of other wireless communication devices. For example, the International Commission on Non-Ionizing Radiation Protection (ICNIRP) recommends that the value of Specific Absorption Rate (SAR) shall not exceed 2.0 W/Kg, while the Federal Communications Commission (FCC) recommends that the value of SAR shall not exceed 1.6 W/Kg. SAR is a measure of the amount of radio frequency energy absorbed by the living body in a normal electromagnetic radiation environment, and watts per kilogram (W/Kg) is the unit of SAR. Besides, since different communication products are used under different conditions, a distance factor is further taken into consideration when measuring the value of SAR. For example, according to the general regulation, measurement of SAR for a handset wireless communication device such as a mobile device or a smart phone should be taken under a condition that the distance between the handset wireless communication device and a human body is 20 cm.

As well known to those skilled in the art, antenna efficiency is usually affected if attempting to reduce interferences of the wireless communication device itself to the outside environment (i.e. to reduce SAR value of the wireless communication device). Therefore, many methods have been disclosed in the prior art in order to maintain the antenna efficiency. One method is by using a proximity sensor to detect the approach of a human body. That is, the RF power of the wireless communication device is reduced when the proximity sensor detects that a human body is approaching, whereas the RF power of the wireless communication device is kept or moderately increased when the proximity sensor does not detect the approach of any human body. In such a condition, interference can be reduced, and meanwhile, antenna efficiency is kept. In the prior art, the proximity sensor includes a receiver or sensor which contains metal materials to detect capacitance variation, so as to determine whether a human body is approaching. However, the included receiver or sensor affects the antenna efficiency, such that the operating frequency band becomes narrow. In other words, the operating frequency band of the antenna, which is originally suitable for broadband demand, is narrowed due to the added receiver or sensor of the proximity sensor. In such a condition, multiple antennas must be designed separately for various communication systems of nearing frequency band demands, causing increase of design and manufacturing costs, and disadvantage of component managements.

Therefore, the prior art needs to be improved.

SUMMARY OF THE INVENTION

The present invention therefore provides a radio-frequency (RF) device and wireless communication device having small size and low interference to the outside environment, maintaining the antenna efficiency, and also capable of being modularized.

An embodiment of the present discloses a radio-frequency (RF) device for a wireless communication device. The RF device comprises an antenna, comprising a radiating element; and a signal feed-in unit, for transmitting and receiving an RF signal; a capacitive sensing unit, for sensing an environment capacitance within a specific range; a connecting unit, comprising a first terminal, a second terminal and a third terminal being mutually conductive, the first terminal electrically connected to the radiating element of the antenna; a direct-current (DC) blocking element, electrically connected between the second terminal of the connecting unit and the signal feed-in unit, for cutting off a DC signal route between the second terminal of the connecting unit and the signal feed-in unit; and a sensing auxiliary unit, electrically connected between the third terminal of the connecting unit and the capacitive sensing unit, comprising a high-frequency blocking element, for blocking a high-frequency signal route between the third terminal of the connecting unit and the capacitive sensing unit, to avoid the RF signal interfering the capacitive sensing unit; and at least a capacitor, connected to the high-frequency blocking element in series and electrically connected between the third terminal of the connecting unit and the capacitive sensing unit, for decreasing an equivalent capacitance from the connecting unit to the radiating element; wherein the signal feed-in unit is coupled to the radiating element via the DC blocking element and the connecting unit, for transmitting and receiving the RF signal via the radiating element; wherein the capacitive sensing unit is coupled to the radiating element via the high-frequency blocking element and the connecting unit, for sensing the environment capacitance within the specific range via the radiating element.

An embodiment of the present further discloses a wireless communication device. The wireless communication device comprises a radio-frequency (RF) signal processing module, for generating an RF signal, and adjusting an energy of the RF signal according to a sensing result; and an RF device, comprising an antenna, comprising a radiating element; and a signal feed-in unit, for transmitting and receiving the RF signal; a capacitive sensing unit, for sensing an environment capacitance within a specific range; a connecting unit, comprising a first terminal, a second terminal and a third terminal being mutually conductive, the first terminal electrically connected to the radiating element of the antenna; a direct-current (DC) blocking element, electrically connected between the second terminal of the connecting unit and the signal feed-in unit, for cutting off a DC signal route between the second terminal of the connecting unit and the signal feed-in unit; and a sensing auxiliary unit, electrically connected between the third terminal of the connecting unit and the capacitive sensing unit, comprising a high-frequency blocking element, for blocking a high-frequency signal route between the third terminal of the connecting unit and the capacitive sensing unit, to avoid the RF signal interfering the capacitive sensing unit; and at least a capacitor, connected to the high-frequency blocking element in series and electrically connected between the third terminal of the connecting unit and the capacitive sensing unit, for decreasing an equivalent capacitance from the connecting unit to the radiating element; wherein the signal feed-in unit is coupled to the radiating element via the DC blocking element and the connecting unit, for transmitting and receiving the RF signal via the radiating element; wherein the capacitive sensing unit is coupled to the radiating element via the high-frequency blocking element and the connecting unit, for sensing the environment capacitance within the specific range via the radiating element.

These and other objectives of the present invention will no doubt become obvious to those of ordinary skill in the art after reading the following detailed description of the preferred embodiment that is illustrated in the various figures and drawings.

DETAILED DESCRIPTION

In order to reduce interference and keep antenna efficiency, the applicant has provided a radio-frequency (RF) device and a wireless communication device in U.S. patent application Ser. No. 13/442,839, which is capable of determining whether an event of a human body approaching, and utilizes an existing radiating element for sensing environment capacitance, instead of utilizing additional receiver or sensor, so as to avoid affecting antenna efficiency. Moreover, for different antenna structures, various dispositions of a capacitive sensing unit are disclosed in U.S. patent application Ser. No. 13/442,839. One of the dispositions is that the capacitive sensing unit and a signal feed-in unit form a common node, and the capacitive sensing unit is electrically connected to the radiating element through the common node (please refer to FIGS. 2A, 2C, 5, 8 of U.S. patent application Ser. No. 13/442, 839 and corresponding detail descriptions), to preform sensing of environment capacitance. In addition, applicant also provides an RF device and a wireless communication device in U.S. patent application Ser. No. 13/964,115, which are based upon the RF device and the wireless communication device in U.S. patent application Ser. No. 13/442,839, and further includes a direct-current (DC) blocking element between the radiating element and a signal feed-in unit for cutting off a DC signal route from the radiating element to the signal feed-in unit and a high-frequency blocking element for cutting off a high-frequency signal route from the radiating element to the capacitive sensing unit. By adding the DC blocking element, the RF device in U.S. patent application Ser. No. 13/964,115 prevents the capacitive sensing unit from charging the signal feed-in unit, so as to avoid erroneous actions and enlarge a sensing range of the capacitive sensing unit. By adding the high-frequency blocking element, a high-frequency input impedance of the capacitive sensing unit is adjusted, so as to reduce affection of the capacitive sensing unit to antenna radiation efficiency. In such a condition, for the structure of the capacitive sensing unit and the signal feed-in unit connecting to the radiating element through the common node, if the DC blocking element and the high-frequency blocking element can be simply included, it is beneficial for reducing manufacturing cost and assembly efficiency is enhanced.

Figure 1:
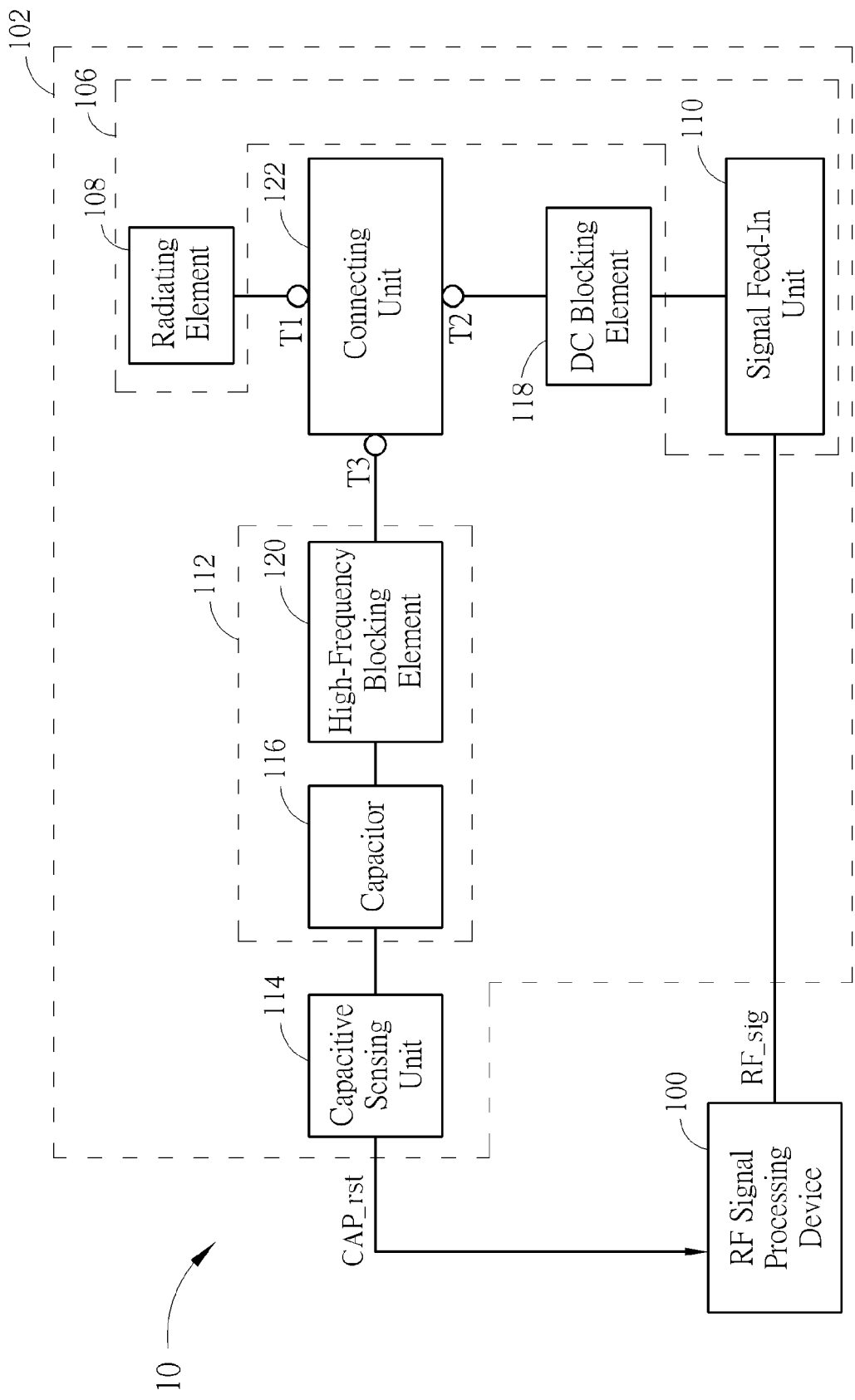
FIG. 1 is a schematic diagram of a wireless communication device according to an embodiment of the present invention.

Please refer to FIG. 1, which is a schematic diagram of a wireless communication device 10 according to an embodiment of the present invention. The wireless communication device 10 may be any electronic product having wireless communication functionality, such as a mobile phone, a computer system, a wireless access point, etc., and briefly comprises an RF signal processing device 100 and an RF device 102. The RF signal processing device 100 is utilized for generating an RF signal RF sig, and adjusting the power of the RF signal RF sig according to a sensing result CAP_rst of an environment capacitance sent from the RF device 102. The RF device 102 comprises an antenna 106, a connecting unit 122, a sensing auxiliary unit 112, a capacitive sensing unit 114 and a direct-current (DC) blocking element 118. The antenna 106 comprises a radiating element 108 and a signal feed-in unit 110. The sensing auxiliary unit 112 is electrically connected between the connecting unit 122 and the capacitive sensing unit 114, and comprises a capacitor 116 and a high-frequency blocking element 120 connected in series. The connecting unit 122 is a three-terminal component, wherein terminals T1-T3 thereof are mutually conductive, and electrically connected to the radiating element 108, the DC blocking element 118 and the high-frequency blocking element 120. The DC blocking element 118 is utilized for cutting off a DC signal route between the second terminal T2 of the connecting unit 122 and the signal feed-in unit 110. The high-frequency blocking element 120 is utilized for cutting off a high-frequency signal route from the third terminal T3 of the connecting unit 122 to the capacitive sensing unit 114, to avoid the RF signal RF sig interfering the capacitive sensing unit 114. In addition, the capacitor 116 is connected between the high-frequency blocking element 120 and the capacitive sensing unit 114 in series, which is utilized for reducing an equivalent capacitance between the connecting unit 122 and the radiating element 108, so as to make sure that the capacitive sensing unit 114 is able to correctly sense the environment capacitance within a specific range through the radiating element 108 and generate the sensing result CAP_rst.

As can be seen by comparing the RF device 102 of FIG. 1 and U.S. patent application Ser. No. 13/964,115 and Ser. No. 13/442,839, the present invention aims at the structure of the capacitive sensing unit 114 and the signal feed-in unit 110 connecting to the radiating element 108 through a common node (i.e., the connecting unit 122), and adds the capacitor 116 to the structure to enhance a sensing sensitivity of the capacitive sensing unit 114. As for operational principles, realizations and variations of the signal feed-in unit 110, the capacitive sensing unit 114, the DC blocking element 118, the high-frequency blocking element 120 and the radiating element 108, please refer to patent application Ser. No. 13/964, 115 and Ser. No. 13/442,839, which is briefly narrated herein.

In short, in the wireless communication device 10, the capacitive sensing unit 114 utilizes the radiating element 108 of the antenna 106 to sense the environment capacitance, and sends the sensing result CAP_rst to the RF signal processing device 100, such that the RF signal processing device 100 may adjust the power of the RF signal RF sig accordingly. In addition, the DC blocking element 118 is capacitive, which may be one or more capacitors, a coupler or any other composite component with DC blocking characteristic, for cutting off the DC signal route from the radiating element 108 (through the connecting unit 122) to the signal feed-in unit 110, to prevent the capacitive sensing unit 114 from charging the signal feed-in unit 110, so as to avoid erroneous actions and enlarge a sensing range of the capacitive sensing unit 114. On the other hand, the high-frequency blocking element 120 is inductive, which may be one or more inductors, a connecting element, a matching network, or any composite component having high-frequency blocking characteristic, for cutting off the high-frequency signal route from the radiating element 108 (through the connecting unit 122) to the capacitive sensing unit 114, to raise a high-frequency impedance of the capacitive sensing unit 114, and reduce affection of the capacitive sensing unit 114 to antenna radiation efficiency. In such a condition, when the RF device 102 emits and receives RF signals via the radiating element 108, the high-frequency blocking element 120 is equivalent to an open circuit for RF signal, i.e., the input impedance seen from the radiating element 108 to the capacitive sensing unit 114 can be regarded as infinite. Therefore, the impedance matching of the radiating element 108 remains unaffected and the antenna efficiency is not affected by the capacitive sensing unit 114. Meanwhile, the DC blocking element 118 is equivalent to a short circuit for RF signals so that the DC blocking element 118 does not affect the RF signals emitted and received by the radiating element 108. On the other hand, when the capacitive sensing unit 114 needs to sense the environment capacitance, the high-frequency blocking element 120 is equivalent to a short circuit for DC signals, i.e., both metal on the high-frequency blocking element 120 and the radiating element 108 electrically connected through the connecting unit 122 become apart of the sensing metal. Meanwhile, the DC blocking element 118 is equivalent to an open circuit for DC signals, i.e., the DC signals from the capacitive sensing unit 114 are blocked by the DC blocking element 118 to prevent charging the signal feed-in unit 110, so as to avoid erroneous actions of the signal feed-in unit 110 or the capacitive sensing unit 114.

In addition, since the radiating element 108 is utilized for emitting and receiving the RF signal RF sig, a capacitive effect exists between the radiating element 108 and a ground, which affects the sensing sensitivity of the capacitive sensing unit 114. The present invention reduces the equivalent capacitance between the connecting unit 122 and the radiating element 108 by connecting the capacitor 116 in series. Thereby, the capacitive sensing unit 114 may correctly sense the environment capacitance via the radiating element 108 within the specific range. Moreover, the capacitor 116 may be disposed between the capacitive sensing unit 114 and the high-frequency blocking element 120, or the capacitor 116 may also be disposed between the high-frequency blocking element 120 and the third terminal T3 of the connecting unit 122. Alternatively, the capacitor 116 may comprise multiple capacitors, and may be distributed between the capacitive sensing unit 114 and the third terminal T3 of the connecting unit 122, which is also within the scope of the present invention.

Therefore, the wireless communication device 10 utilizes the existing radiating element 108 of the RF device 102 to perform sensing of environment capacitance, without additional receiver or sensor. Thereby, affection on the radiation efficiency of the antenna 106 is avoided, and a size of the wireless communication device 10 is also decreased. Meanwhile, only one antenna needs to be designed for adjacent frequency bands of different communication systems. Therefore, the design and manufacturing costs can be reduced, and device components can be easily managed. In another perspective, as can be seen from FIG. 1, the connecting unit 122, the sensing auxiliary unit 112 and the DC blocking element 118 are disposed in a neighborhood, which may be integrated as a common module, so as to reduce the manufacturing cost and enhance the assembly efficiency.

Figure 2:
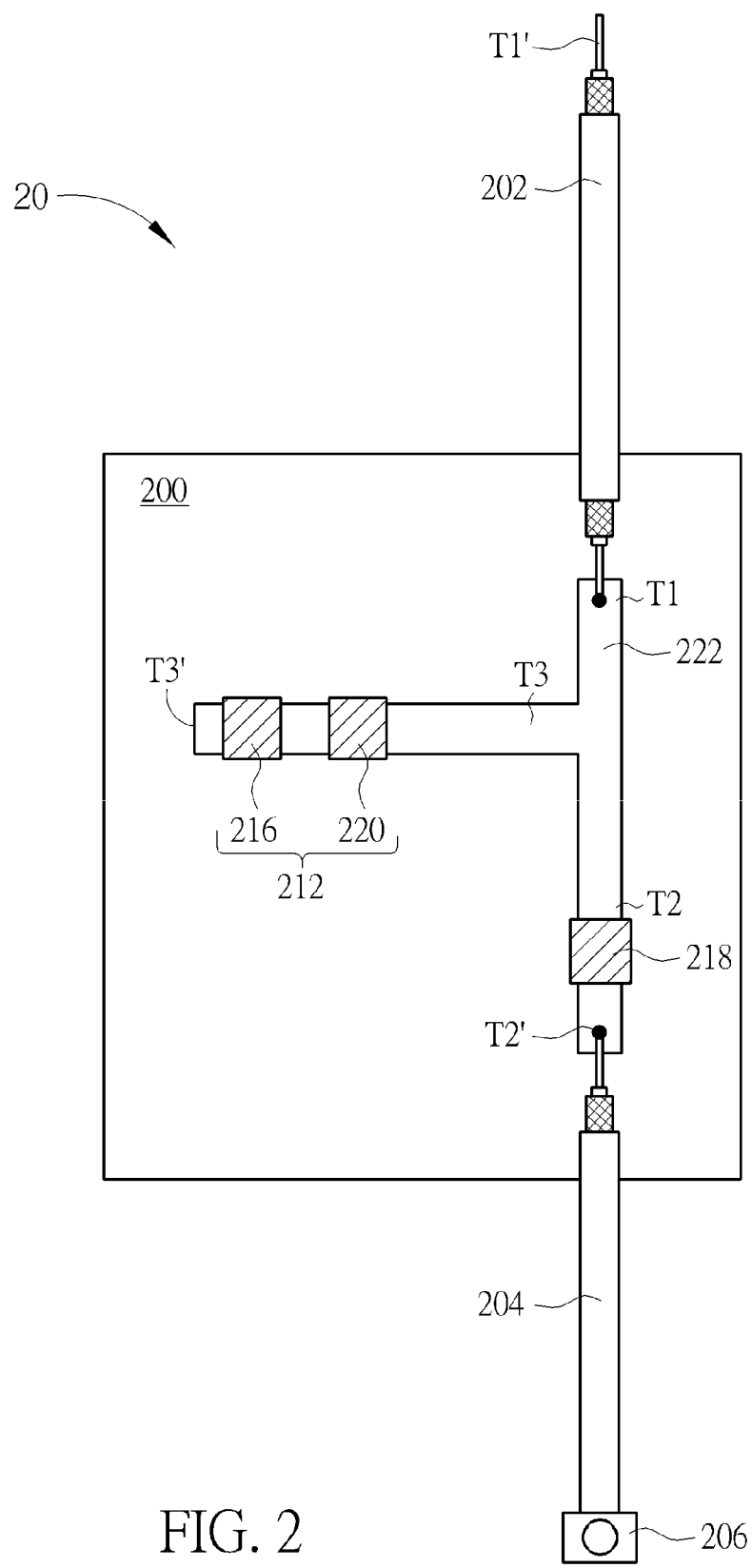
FIG. 2 is a schematic diagram of a connecting module according to an embodiment of the present invention.

For example, please refer to FIG. 2, which is a schematic diagram of a connecting module 20 according to an embodiment of the present invention. The connecting module 20 comprises a substrate 200, a connecting unit 222, a sensing auxiliary unit 212 and a DC blocking element 218, which is realized by modularization or replaces the connecting unit 122, the sensing auxiliary unit 112 and the DC blocking element 118 in FIG. 1, and connects to the radiating element 108 and the signal feed-in unit 110 through a first signal line 202, a second signal line 204 and a connecting interface 206. In detail, the substrate 200 may be a circuit board, on which the connecting unit 222 is formed, and the sensing auxiliary unit 212 and the DC blocking element 218 are disposed. The sensing auxiliary unit 212 comprises a capacitor 216 and a high-frequency blocking element 220 connected in series. The connecting unit 222 is made of metal conductor, and three terminals T1-T3 thereof are mutually conductive. The second terminal T2 is connected to the DC blocking element 218 and forms a terminal T2'. The third terminal T3 is connected to the sensing auxiliary unit 212 and forms a terminal T3', wherein the terminal T3' is utilized for connecting the capacitive sensing unit 114. The first signal line 202 and the second signal line 204 are made of coaxial cable. The coaxial cable, known by those skilled in the art, comprises a metal line, an insulating layer, a metal braid, and a protection layer arranged in an order from inside to outside. A terminal of the metal line of the first signal line 202 is electrically connected to the first terminal T1 of the connecting unit 222 (e.g., by welding), and another terminal (denoted as T1') is electrically connected to the radiating element 108. A terminal of the metal line of the second signal line 204 is electrically connected to the terminal T2' of the connecting module 20 (e.g., by welding), and another terminal is connected to the connecting interface 206. The connecting interface 206 is connected to the signal feed-in unit 110. In addition, the metal braid of the first signal line 202 and the second signal line 204 may be conductive through the substrate 200, and connect to the ground through the connecting interface 206. For example, in an embodiment, the substrate 200 is a multi-layer circuit board, and the connecting unit 222 may be formed on the topmost metal layer of the substrate 200. The metal braids of the first signal line 202 and the second signal line 204 may be conductive and connected through other metal layers of the substrate 200. Alternatively, in another embodiment, the connecting unit 222 is formed on the topmost metal layer of the substrate 200, and a connecting path insulated from the connecting unit 222 is placed on the same topmost layer. The metal braid of the first signal line 202 and the second signal line 204 may be conductive and connected through the connecting path.

The connecting module 20 of FIG. 2 illustrates that the connecting unit 122, the sensing auxiliary unit 112 and the DC blocking element 118 in FIG. 1 are realized by modularization, but not limited herein. Those skilled in the art may make modification and alternation accordingly. For example, in FIG. 2, the first signal line 202 is utilized for connecting the connecting unit 222 and the radiating element 108, and a length of the first signal line 202 may be various and depends on different requirements, e.g., between 1 meter and 3 centimeters. In another embodiment, the length of the first signal line 202 may be between 200 millimeters and 600 millimeters. Since different lengths of signal lines generate different capacitive effects (i.e., capacitance) between the metal line and the metal braid, a capacitance of the capacitor 216 should be properly chosen, e.g., between 3 picofarad (pF) and 1 nanofarad (nF), such that the capacitor 216 may effectively reduce the equivalent capacitance between the connecting unit 222 and the radiating element 108, to make sure that the capacitive sensing unit 114 is able to correctly sense the environment capacitance within the specific range. In another embodiment, the capacitance of the capacitor 216 may be between 10 pF and 220 pF.

Figure 3A:
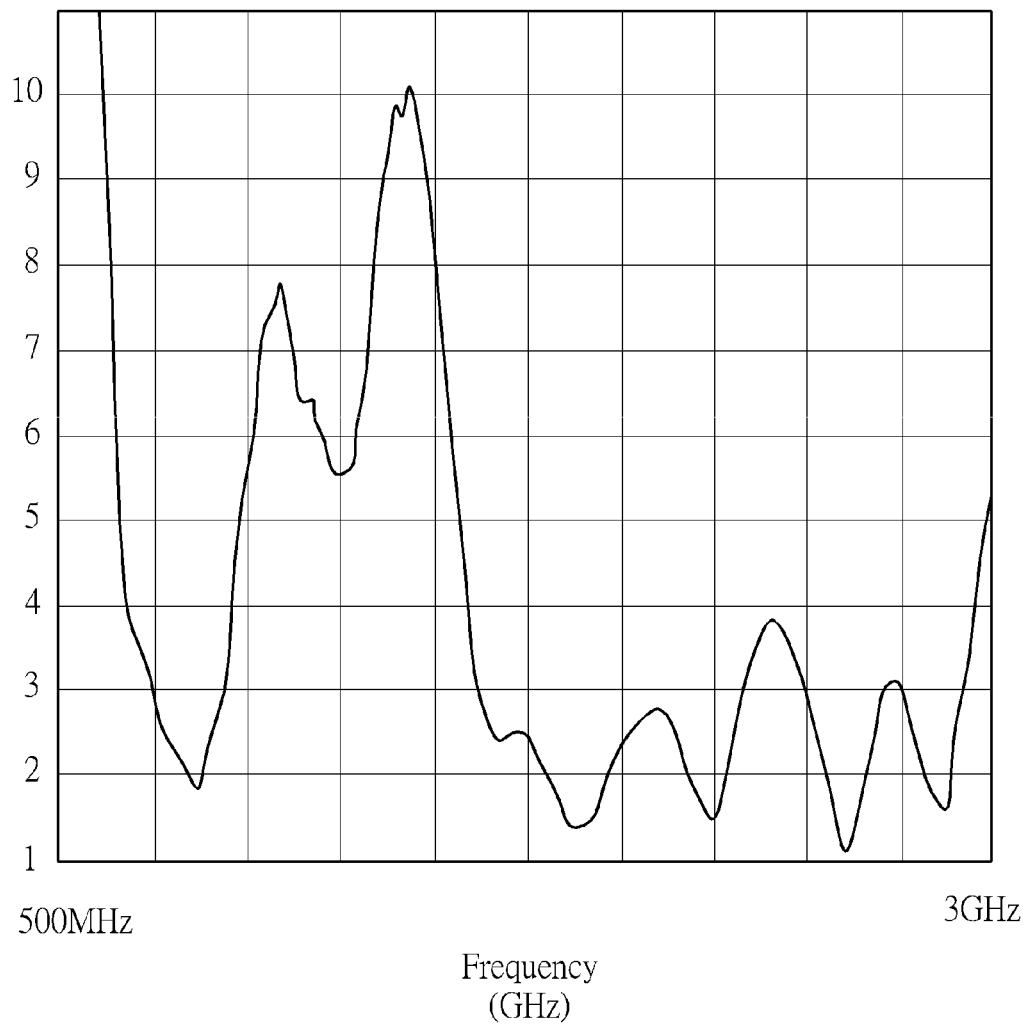
FIGS. 3A, 3B, 3C are schematic diagrams of voltage standing wave ratio (VSWR) and antenna efficiency of an antenna before/after the connecting module of FIG. 2 is equipped when a length of a first signal line is 200 mm.
Figure 3B:
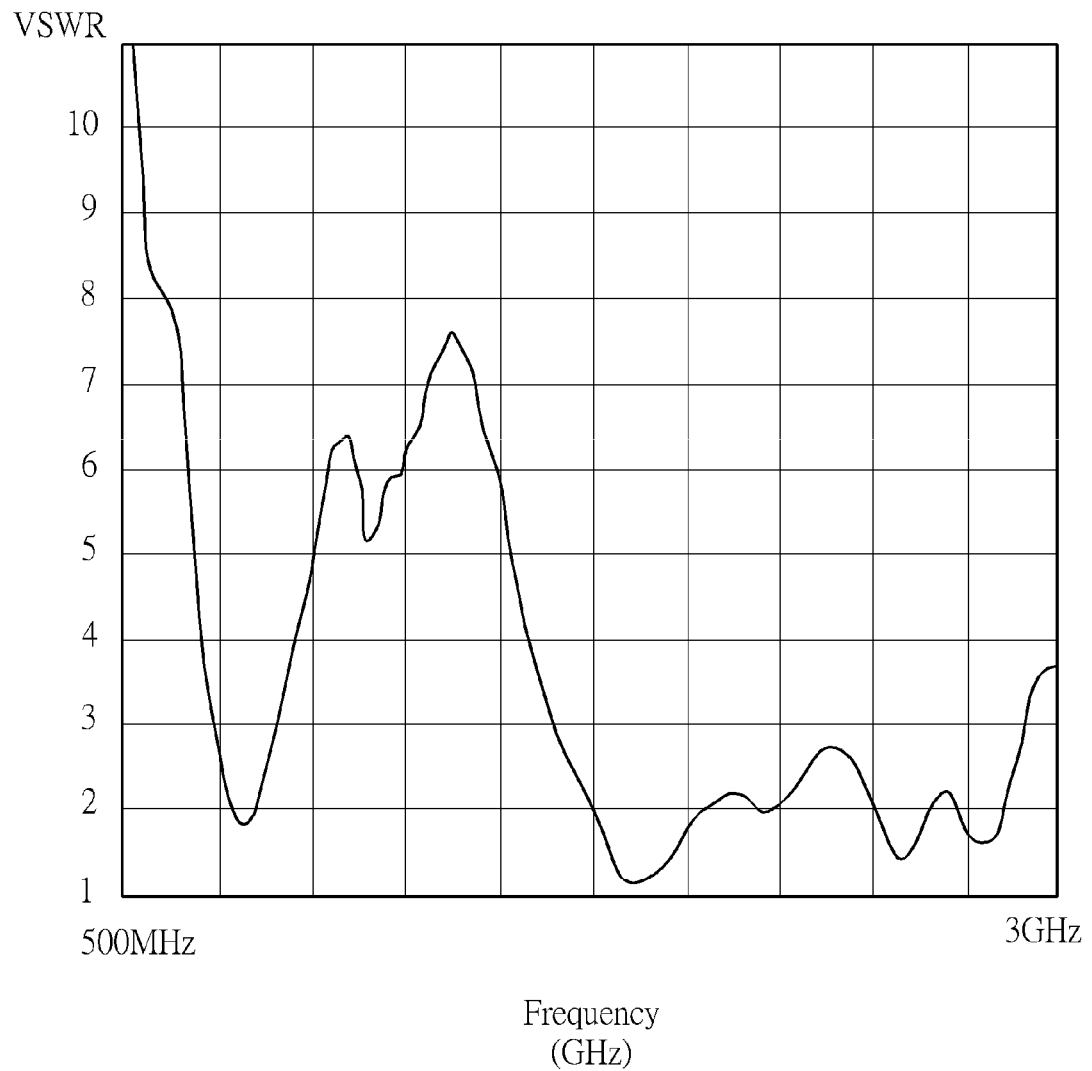
Figure 3C:
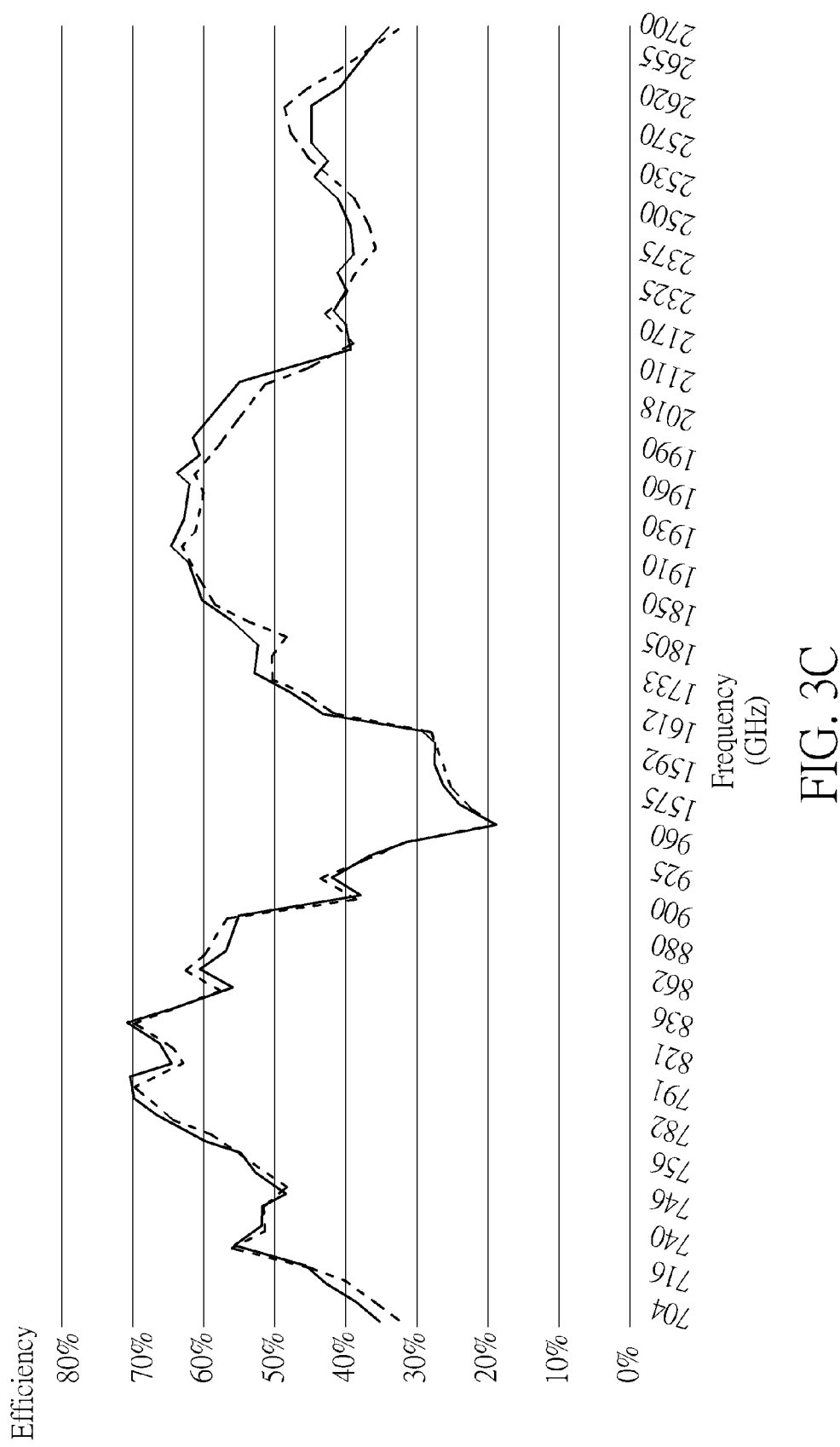
Figure 4A:
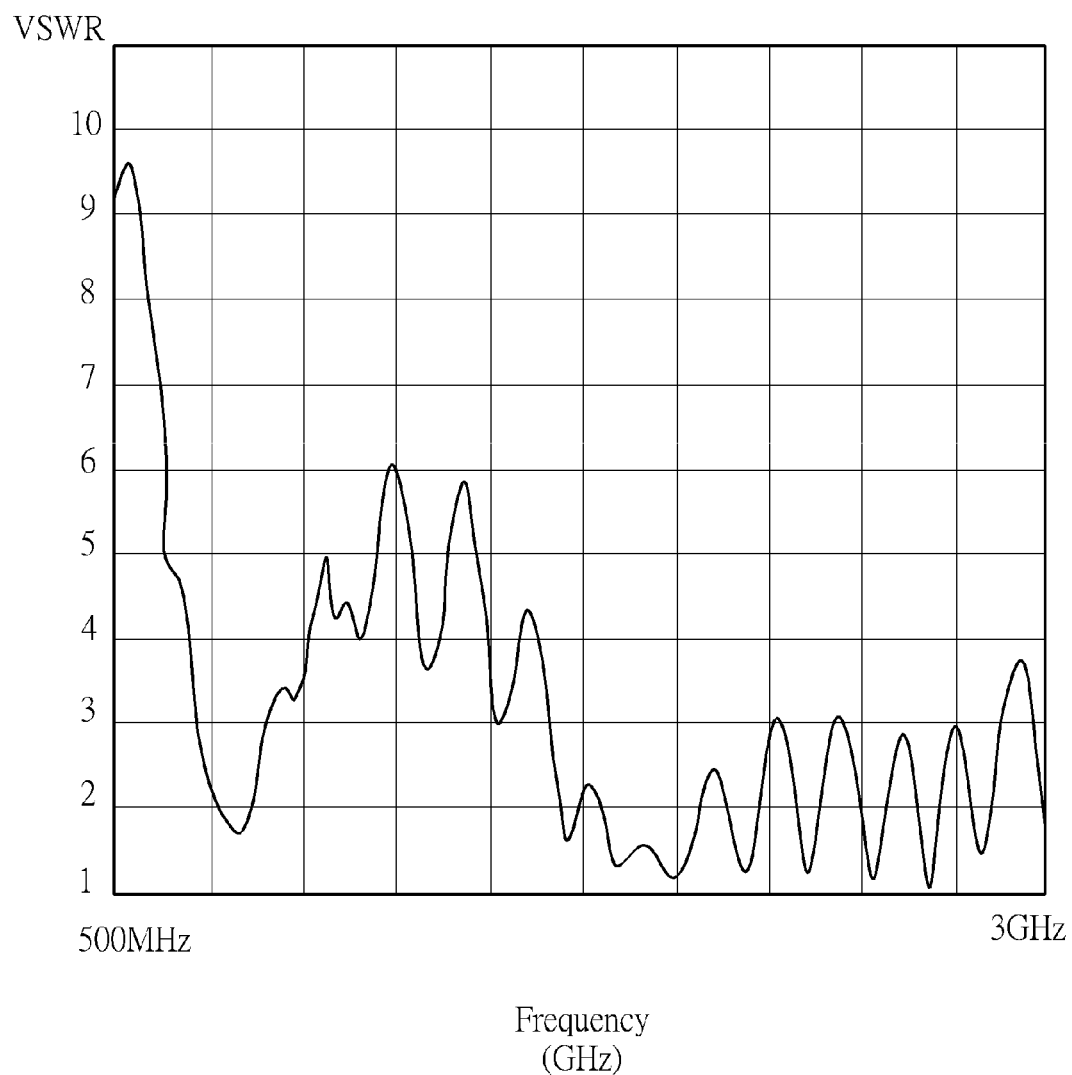
FIGS. 4A, 4B, 4C are schematic diagrams of voltage standing wave ratio (VSWR) and antenna efficiency of the antenna before/after the connecting module of FIG. 2 is equipped when the length of the first signal line is 600 mm.
Figure 4B:
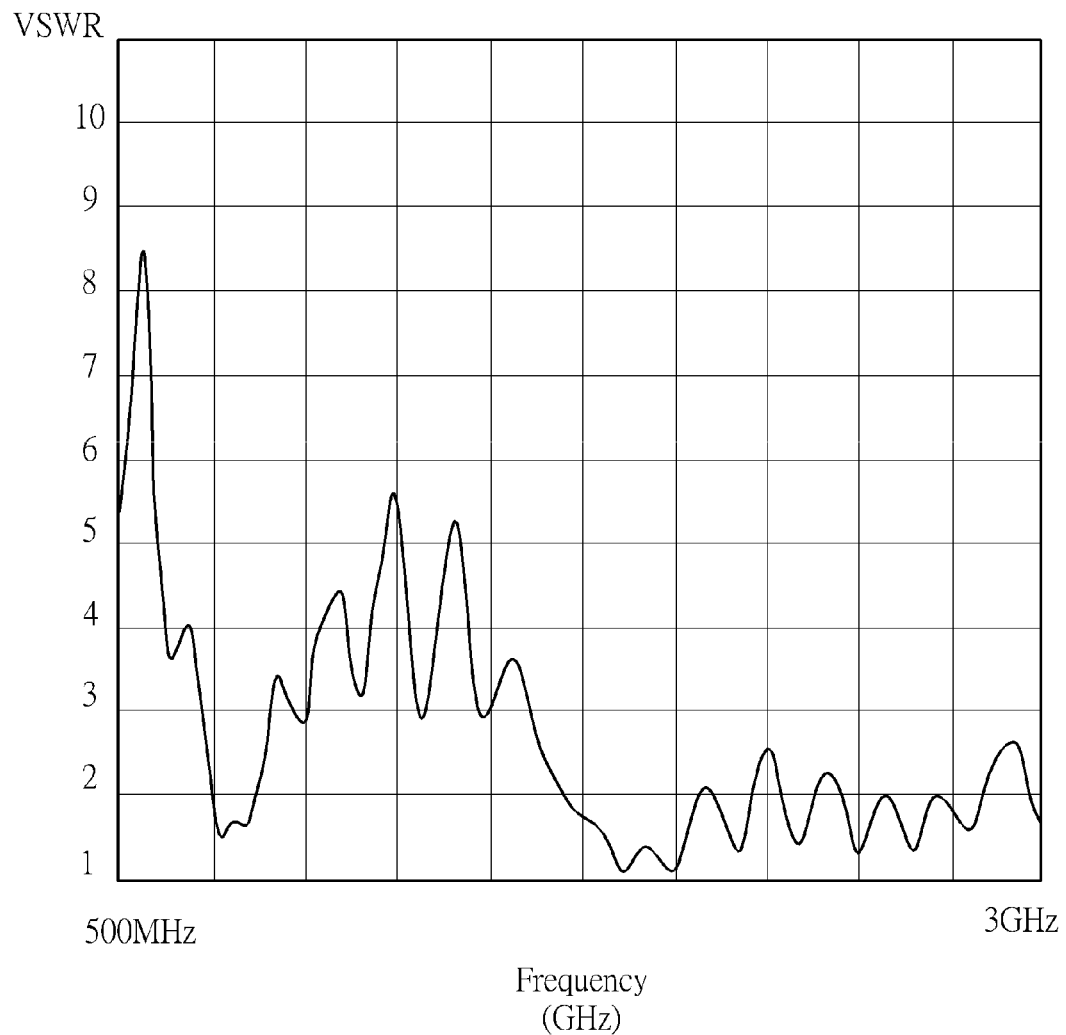
Figure 4C:
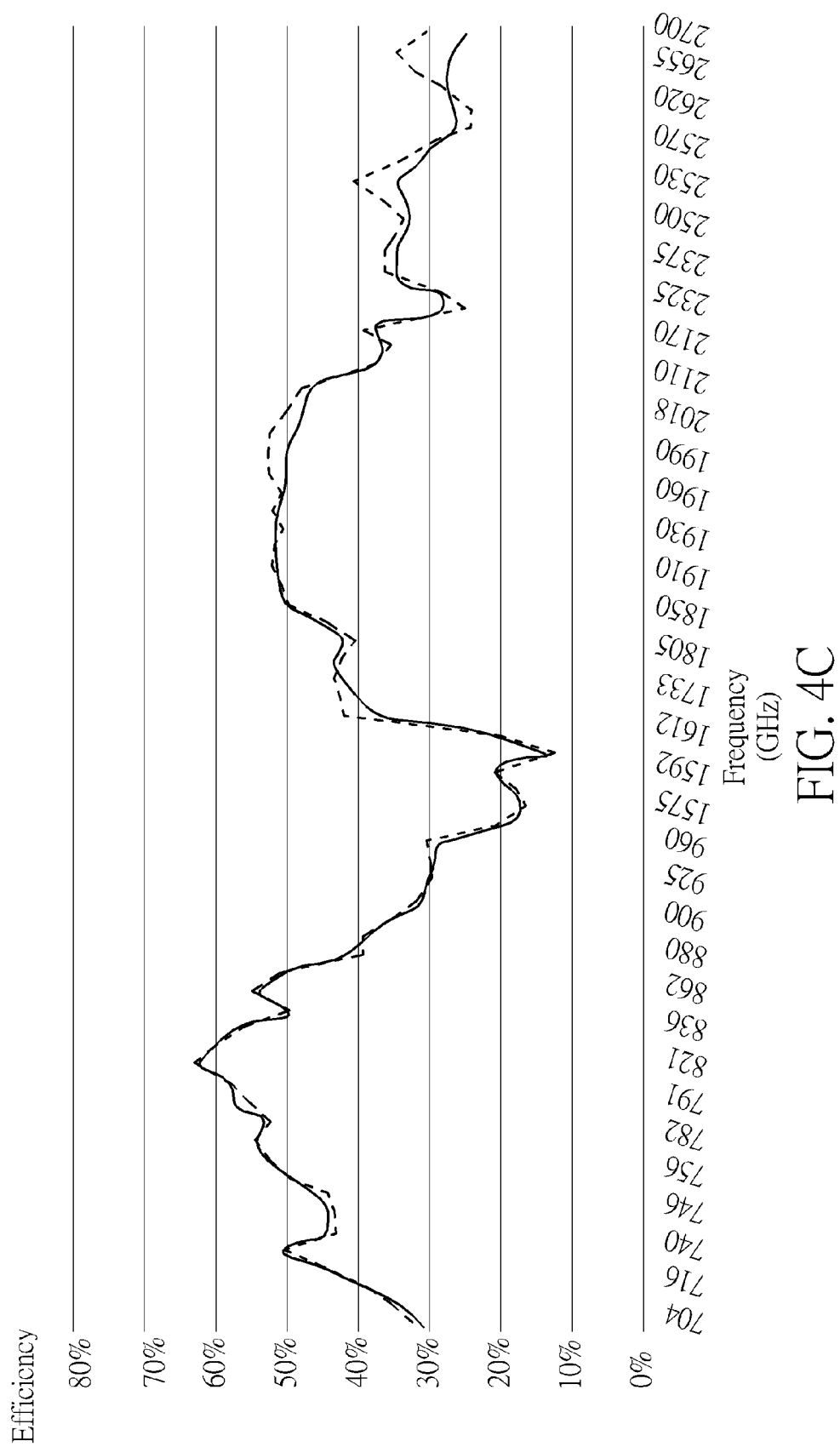

The connecting module 20 realizes the connecting unit 122, the sensing auxiliary unit 112 and the DC blocking element 118 in FIG. 1 by modularization, and the connecting module 20 also avoids affection on the radiation efficiency of the antenna 106. Take the antenna applied for Long Term Evolution (LTE) system as an example, please refer to FIGS. 3A to 3C and FIGS. 4A to 4C. FIG. 3A is a schematic diagram of voltage standing wave ratio (VSWR) of the antenna 106 without equipping the connecting module 20 when the length of the first signal line 202 is 200 mm. FIG. 3B is a schematic diagram of VSWR of the antenna 106 with equipping the connecting module 20 when the length of the first signal line 202 is 200 mm. FIG. 3C is a schematic diagram of antenna efficiency of the antenna 106 before/after the connecting module 20 is equipped when the length of the first signal line 202 is 200 mm, wherein a dot curve represents the antenna efficiency before the connecting module 20 is equipped, and a solid curve represents the antenna efficiency after the connecting module 20 is equipped. In addition, FIG. 4A is a schematic diagram of VSWR of the antenna 106 without equipping the connecting module 20 when the length of the first signal line 202 is 600 mm. FIG. 4B is a schematic diagram of VSWR of the antenna 106 with equipping the connecting module 20 when the length of the first signal line 202 is 600 mm. FIG. 4C is a schematic diagram of antenna efficiency of the antenna 106 before/after the connecting module 20 is equipped when the length of the first signal line 202 is 600 mm, wherein a dot curve represents the antenna efficiency before the connecting module 20 is equipped, and a solid curve represents the antenna efficiency after the connecting module 20 is equipped.

As can be seen from FIGS. 3A to 3C and FIGS. 4A to 4C, for different lengths of the first signal line 202, the connecting module 20 would not affect characteristics of the antenna 106 such as operating frequency band, bandwidth, antenna efficiency, gain, etc., such that the design and manufacturing costs are reduced.

Figure 5:
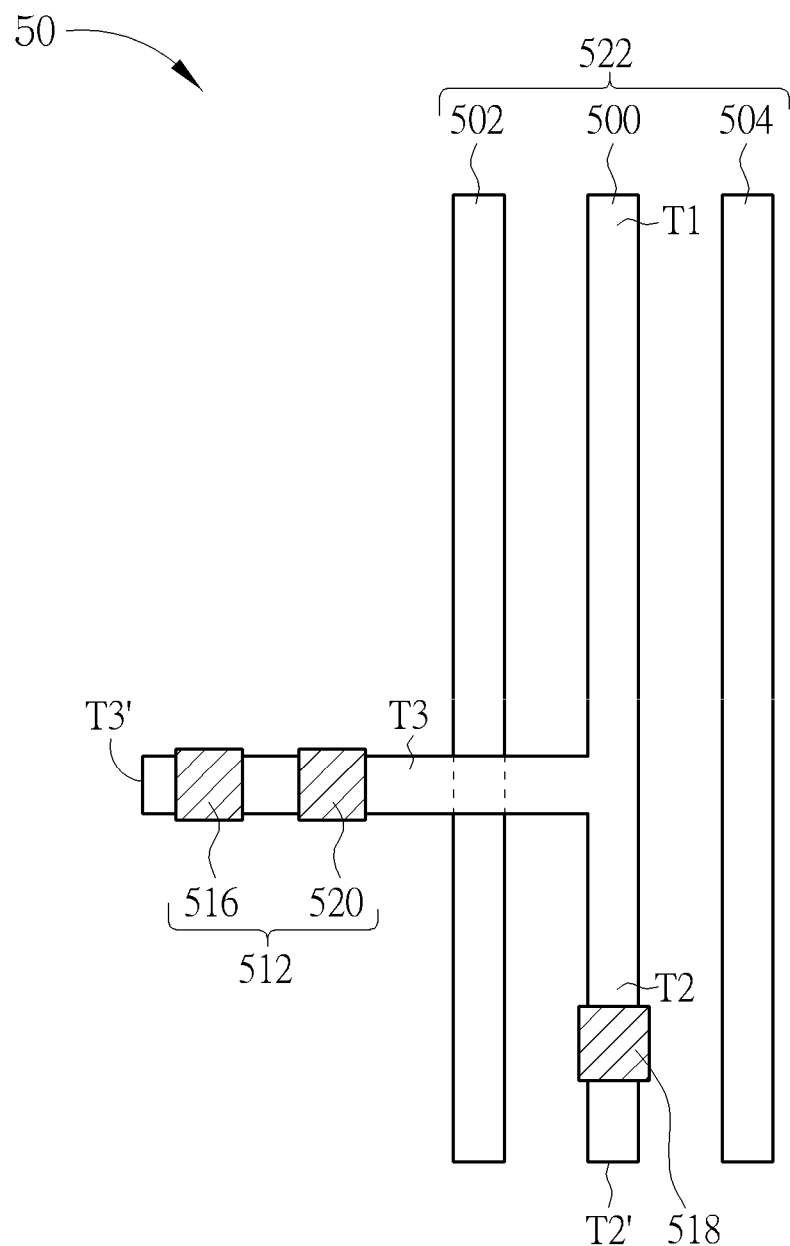
FIG. 5 is a schematic diagram of a connecting module according to an embodiment of the present invention.

Notably, the connecting module 20 is an embodiment illustrating realization of the connecting unit 122, the sensing auxiliary unit 112 and the DC blocking element 118 in FIG. 1 by modularization, and not limited herein. Those skilled in the art may make modification and alternation accordingly. For example, FIG. 5 is a schematic diagram of a connecting module 50 according to an embodiment of the present invention. The connecting module 50 comprises a connecting unit 522, a sensing auxiliary unit 512 and a DC blocking element 518. The sensing auxiliary unit 512 comprises a capacitor 516 and a high-frequency blocking element 520 connected in series. The connecting module 50 realizes by modularization or replaces the connecting unit 122, the sensing auxiliary unit 112 and the DC blocking element 118 in FIG. 1. In detail, the connecting unit 522 is a coplanar waveguide (CPW) transmission line composed of metal lines 500, 502, 504, wherein the metal line 500 is utilized for emitting RF signals, and the metal lines 502, 504 are utilized for grounding. Three terminals T1-T3 of the metal line 500 are mutually conductive. The first terminal T1 is electrically connected the radiating element 108 (e.g., by welding). The second terminal T2 is electrically connected to the DC blocking element 518 and forms a terminal T2', and the terminal T2' is electrically connected to the signal feed-in unit 110. The third terminal T3 is connected to the sensing auxiliary unit 512 and forms a terminal T3', and the terminal T3' is electrically connected to the capacitive sensing unit 114. In addition, a crossing section of the metal lines 500, 502 should be insulated and no signal is connected through the crossing section. For example, one way to make sure the insulation of the crossing section is to coat insulation material between the metal lines in the crossing section of the metal lines 500, 502, and not limited herein.

Figure 6A:
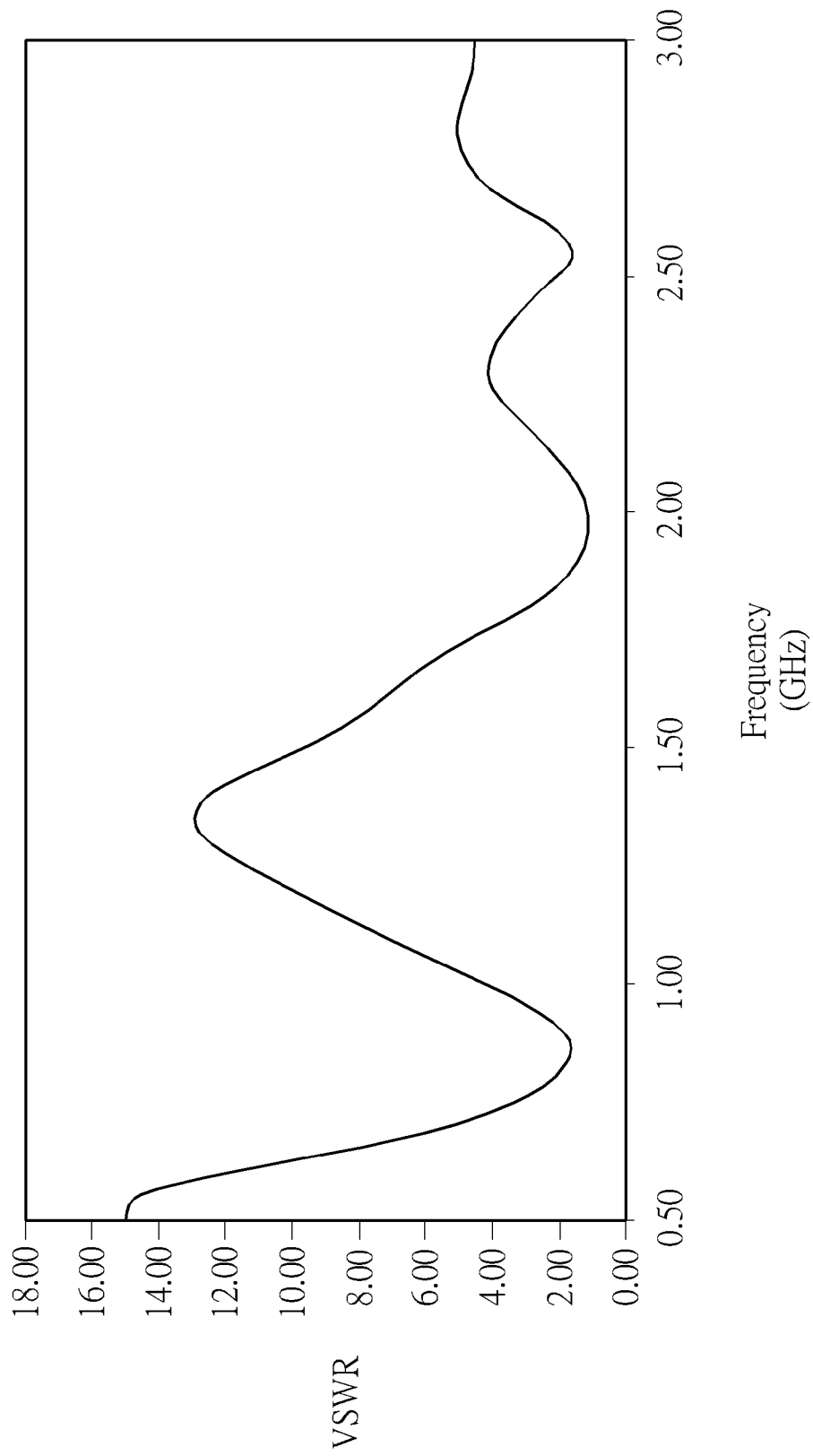
FIGS. 6A, 6B are schematic diagrams of voltage standing wave ratio (VSWR) and antenna efficiency of the antenna before/after equipping the connecting module of FIG. 5.
Figure 6B:
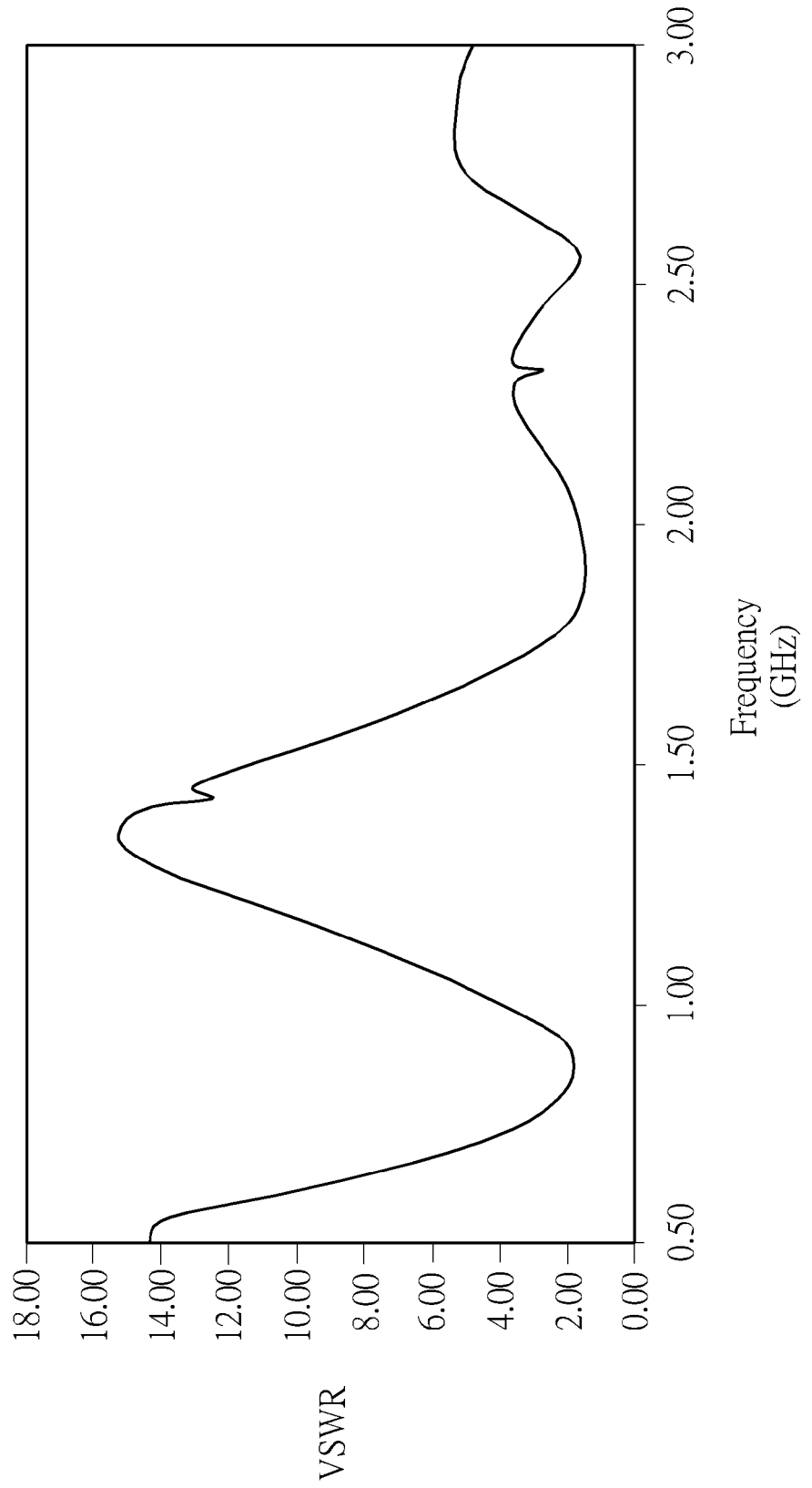

The connecting module 50 realizes the connecting unit 122, the sensing auxiliary unit 112 and the DC blocking element 118 in FIG. 1 by modularization, and the connecting module 50 also avoids affection on the radiation efficiency of the antenna 106. Take the antenna applied for Long Term Evolution (LTE) system as an example, please refer to FIGS. 6A to 6B. FIG. 6A is a schematic diagram of VSWR of the antenna 106 without equipping the connecting module 50. FIG. 6B is a schematic diagram of VSWR of the antenna 106 with equipping the connecting module 50. As can be seen from FIGS. 6A, 6B, equipping the connecting module 50 would not affect characteristics of the antenna 106 such as operating frequency band, bandwidth, antenna efficiency, gain, etc., such that the design and manufacturing costs are reduced.

Both the connecting module 20 in FIG. 2 and the connecting module 50 in FIG. 5 realize the connecting unit 122, the sensing auxiliary unit 112 and the DC blocking element 118 of the RF device 102 by modularization. Since the capacitive sensing unit 114 and the signal feed-in unit 110 are connected to the radiating element 108 through the common node (i.e., the connecting unit 122), the connecting unit 122, the sensing auxiliary unit 112 and the DC blocking element 118 are disposed in the neighborhood, which may be integrated as a common module, so as to reduce the manufacturing cost and enhance the assembly efficiency.

As can be seen from the above, for the structure of the capacitive sensing unit 114 and the signal feed-in unit 110 connecting to the radiating element 108 through the common node, the present invention adds the capacitor 116 between the capacitive sensing unit 114 and the common node, to reduce the equivalent capacitance and enhance the sensing sensitivity of the capacitive sensing unit 114. Meanwhile, since the capacitive sensing unit 114 and the signal feed-in unit 110 connect to the radiating element 108 through the common node, the connecting unit 122, the sensing auxiliary unit 112 and the DC blocking element 118 may be disposed in the neighborhood, which may be integrated as the common module, so as to reduce the manufacturing cost and enhance the assembly efficiency.

In addition, the embodiments in the above illustrate how to enhance the sensing sensitivity and the assembly efficiency under the structure of the capacitive sensing unit 114 and the signal feed-in unit 110 connecting to the radiating element 108 through the common node. As for the form of the radiating element 108, the realization method of the capacitive sensing unit 114, the feed-in method of the signal feed-in unit 110, the realization method of the RF signal processing device 100, etc., may be referred to U.S. patent application Ser. No. 13/442,839 and Ser. No. 13/964,115, or modified according to system requirements. For example, if the antenna 106 comprise a grounding unit for providing grounding, and the radiating element 108 is coupled to the grounding unit through a ground terminal, then at least a grounding capacitor may be disposed between the ground unit and the ground terminal, for cutting off a direct-current signal route from the ground terminal to the grounding unit. Related connecting methods may be referred to U.S. patent application Ser. No. 13/442,839 and Ser. No. 13/964,115. A type of the antenna 106 are not limited, and can be a planer inverted F antenna, a dipole antenna, a folded dipole antenna, a loop antenna, a microstrip antenna or a coupling antenna, etc., which depends on system requirements.

In the conventional art, to reduce interference and keep antenna efficiency, a proximity sensor is utilized for sensing capacitance variation caused by approach of a human body, so as to determine an event of approach of a human body. However, the proximity sensor includes a receiver or a sensor containing metal materials, and affects antenna efficiency, which requires extra cost to adjust the antenna. In comparison, the present invention utilizes existing radiating element instead of adding receiver or sensor, to perform environment capacitance sensing. Meanwhile, the present invention further utilizes the DC blocking element to block the DC signal flowing from the radiating element to the signal feed-in unit, and utilizes the high-frequency blocking element to block the RF signal flowing from the radiating element to the capacitive sensing unit, so as to increase the sensing range of the sensing unit and decrease the affection on the antenna efficiency. In addition, the present invention connects the capacitive sensing unit and the signal feed-in unit to the radiating element through the common node, and includes the capacitor between the capacitive sensing unit and the node, to reduce the equivalent capacitance and enhance the sensing sensitivity of the capacitive sensing unit. The structure may dispose the connecting unit 122, the sensing auxiliary unit 112 and the DC blocking element 118 in the neighborhood, which may be integrated as the common module, so as to reduce the manufacturing cost and enhance the assembly efficiency.

In summary, the present invention utilizes the radiating element of the antenna to sense environment capacitance within a specific range and adjust power of RF signals accordingly, and therefore, radiation efficiency of antenna can be maintained. Furthermore, only one antenna needs to be designed for similar frequency bands of different communication systems, which is beneficial for reducing the design and manufacturing cost and managing the device components. Thus, the present invention helps to design an RF device with small size, high efficiency, high environmental adaptability, and low interference features. In addition, the present invention is able to be modularized, and enhance the assembly efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio-frequency (RF) device for a wireless communication device, the RF device comprising:
   an antenna, comprising:
      a radiating element; and
      a signal feed-in unit, for transmitting and receiving an RF signal;
   a capacitive sensing unit, for sensing an environment capacitance within a specific range;
   a connecting unit, comprising a first terminal, a second terminal and a third terminal being mutually conductive, the first terminal electrically connected to the radiating element of the antenna;
   a direct-current (DC) blocking element, electrically connected between the second terminal of the connecting unit and the signal feed-in unit, for cutting off a DC signal route between the second terminal of the connecting unit and the signal feed-in unit; and
   a sensing auxiliary unit, electrically connected between the third terminal of the connecting unit and the capacitive sensing unit, comprising:
      a high-frequency blocking element, for blocking a high-frequency signal route between the third terminal of the connecting unit and the capacitive sensing unit, to avoid the RF signal interfering the capacitive sensing unit; and
      at least a capacitor, connected to the high-frequency blocking element in series and electrically connected between the third terminal of the connecting unit and the capacitive sensing unit, for decreasing an equivalent capacitance from the connecting unit to the radiating element;
   wherein the signal feed-in unit is coupled to the radiating element via the DC blocking element and the connecting unit, for transmitting and receiving the RF signal via the radiating element;
   wherein the capacitive sensing unit is coupled to the radiating element via the high-frequency blocking element and the connecting unit, for sensing the environment capacitance within the specific range via the radiating element.

2. The RF device of claim 1, wherein the antenna further comprises:
   a grounding unit, for providing grounding;
   a ground terminal, coupled to the grounding unit; and
   at least a grounding capacitor, electrically connected between the ground terminal and the grounding unit, for cutting off a direct-current signal route from the ground terminal to the grounding unit.

3. The RF device of claim 1, wherein the connecting unit further comprises a signal line, electrically connected between the first terminal and the radiating element, the signal line comprises a metal line and a metal braid, and the metal braid insulatedly covers the metal line.

4. The RF device of claim 3, wherein a length of the signal line is between 1 meter (m) and 3 centimeters (cm), and a capacitance of the at least a capacitor is between 3 picofarad (pF) and 1 nanofarad (nF).

5. The RF device of claim 1, wherein the antenna is a planer inverted F antenna, a dipole antenna, a folded dipole antenna, a loop antenna, a microstrip antenna or a coupling antenna.

6. The RF device of claim 1, wherein the high-frequency blocking element is inductive.

7. The RF device of claim 1, wherein the DC blocking element is capacitive.

8. A wireless communication device, comprising:
   a radio-frequency (RF) signal processing module, for generating an RF signal, and adjusting an energy of the RF signal according to a sensing result; and
   an RF device, comprising:
      an antenna, comprising:
         a radiating element; and
         a signal feed-in unit, for transmitting and receiving the RF signal;
      a capacitive sensing unit, for sensing an environment capacitance within a specific range;
      a connecting unit, comprising a first terminal, a second terminal and a third terminal being mutually conductive, the first terminal electrically connected to the radiating element of the antenna;
      a direct-current (DC) blocking element, electrically connected between the second terminal of the connecting unit and the signal feed-in unit, for cutting off a DC signal route between the second terminal of the connecting unit and the signal feed-in unit; and a sensing auxiliary unit, electrically connected between the third terminal of the connecting unit and the capacitive sensing unit, comprising:
    a high-frequency blocking element, for blocking a high-frequency signal route between the third terminal of the connecting unit and the capacitive sensing unit, to avoid the RF signal interfering the capacitive sensing unit; and
    at least a capacitor, connected to the high-frequency blocking element in series and electrically connected between the third terminal of the connecting unit and the capacitive sensing unit, for decreasing an equivalent capacitance from the connecting unit to the radiating element;
    wherein the signal feed-in unit is coupled to the radiating element via the DC blocking element and the connecting unit, for transmitting and receiving the RF signal via the radiating element;
    wherein the capacitive sensing unit is coupled to the radiating element via the high-frequency blocking element and the connecting unit, for sensing the environment capacitance within the specific range via the radiating element.

9. The wireless communication device of claim 8, wherein the antenna further comprises:
    a grounding unit, for providing grounding;
    a ground terminal, coupled to the grounding unit; and
    at least a grounding capacitor, electrically connected between the ground terminal and the grounding unit, for cutting off a direct-current signal route from the ground terminal to the grounding unit.

10. The wireless communication device of claim 8, wherein the connecting unit further comprises a signal line, electrically connected between the first terminal and the radiating element, the signal line comprises a metal line and a metal braid, and the metal braid insulatedly covers the metal line.

11. The wireless communication device of claim 10, wherein a length of the signal line is between 1 m and 3 cm, and a capacitance of the at least a capacitor is between 3 picofarad (pF) and 1 nanofarad (nF).

12. The wireless communication device of claim 8, wherein the antenna is a planer inverted F antenna, a dipole antenna, a folded dipole antenna, a loop antenna, a microstrip antenna or a coupling antenna.

13. The wireless communication device of claim 8, wherein the high-frequency blocking element is inductive.

14. The wireless communication device of claim 8, wherein the DC blocking element is capacitive.

* * * * *